UNITED STATES PATENT OFFICE 2,180,809

BASIC CONDENSATION PRODUCTS AND A PROCESS FOR THEIR MANUFACTURE

Valentin Kartaschoff, Basel, Switzerland, assignor to the firm of Chemical Works formerly Sandoz, Basel, Switzerland No Drawing. Application November 8, 1937, Serial No. 173,527. In Germany November 10, 1936

14 Claims. (Cl. 260—296)

The present invention relates to new basic condensation products which yield with sulphonated dyestuffs water insoluble or difficultly soluble addition products and to a process for their manufacture.

I have found that new valuable basic condensation products can be obtained by treating hydroxylated polyamines containing at least one alcoholic hydroxy group with halogenating agents in order to replace all or some of the hydroxy groups by halogen atoms and condensing the halogenalkyl compounds thus obtained with ammonia or with an aliphatic, cycloaliphatic, araliphatic, aromatic or heterocyclic primary, secondary or tertiary base.

The present process comprises therefore two essential steps, one of which is the preparation of halogen derivatives of polyamines, the other being the condensation of these halogen derivatives with ammonia or with an organic nitrogen containing compound.

The starting compounds used in the first essential step of the present process may be prepared by condensation of ethylenedichloride, ethyleneoxide, glycerinedichlorhydrine and glycerineepichlorhydrine with ammonia and its organic derivatives such as the aliphatic, cycloaliphatic, araliphatic, aromatic and heterocyclic mono- and polyamino compounds. These hydroxyalkylpolyamines may possess various constitutions, but in order to be employed in the present process must contain at least one alcoholic hydroxy group. If for instance $\alpha$, $\gamma$-glycerinedichlorhydrine is condensed with ammonia or with mono-, di- or triethanolamine, condensation products of the following probable constitution will be obtained:

I. Condensation product of $\alpha$, $\gamma$-glycerinedichlorhydrine with ammonia having the formula:

$$H_2N-CH_2-CH-CH_2-\left[-NH-CH_2-CH-CH_2-\right]-NH_2$$
$$\phantom{H_2N-CH_2-}\overset{|}{OH} \phantom{\left[-NH-CH_2-\right.}\overset{|}{OH}$$

II. Condensation product of $\alpha$, $\gamma$-glycerinedichlorhydrine with monoethanolamine having the formula:

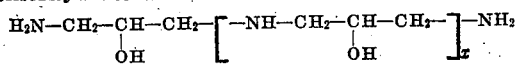

III. Condensation product of $\alpha$, $\gamma$-glycerinedichlorhydrine with diethanolamine having the formula:

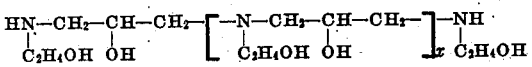

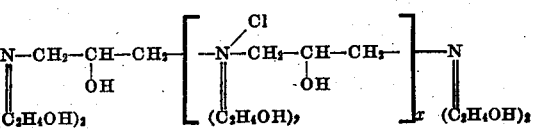

IV. Condensation product of $\alpha$, $\gamma$-glycerinedichlorhydrine with triethanolamine having the formula:

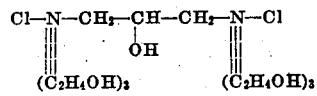

All these compounds are useful as starting products for carrying out the first essential step of the present process.

In order to transform them into the respective halogenalkylpolyamines, several methods which have already been used for the halogenation of simple hydroxyalkylamines may be employed. The halogenation of the starting products may for instance be carried out according to the process described by Knorr (Ber. 38, 3133) by treating them with hydrochloric acid under pressure, or according to the process of Gough and King (Journ. Chem. Soc. London, 1928, p. 2436–2437) by treating them with thionylchloride. But also other halogenating agents such as the pentachloride, the trichloride and the oxychloride of phosphorus, the sulphurylchloride, etc., may be used.

By replacement of the aliphatic hydroxy group by a halogen atom such as chlorine or bromine, new halogenalkylpolyamines are obtained which possess a very reactive halogen-atom and as it will be shown below, condense very easily with other amino compounds.

According to the quantity of the halogenating agent used in the first step of the present process, all or a part of the hydroxy groups contained in the polyamine will be replaced by the halogen atoms, and therefore, various halogenated compounds can be obtained, for example such that are completely free from hydroxyalkyl groups and such that besides some halogen alkyl groups contain one or several hydroxyalkyl groups. If for instance the polyamine obtained by interaction of $\alpha$, $\gamma$-glycerinedichlorhydrine with monoethanolamine

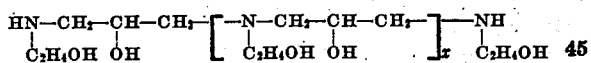

is treated in such a manner that all hydroxy groups are replaced by halogen, a halogenalkylpolyamine of the following probable formula will be obtained:

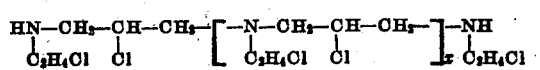

If low molecular condensation products obtainable by interaction of primary or secondary hydroxyalkylamines such as mono- or diethanolamine with halogenated aliphatic compounds such as ethylenebromide or -chloride, α,γ-glycerinedichlorhydrine etc. are subjected to the halogenation process, compounds will be obtained which have the following formulae:

and

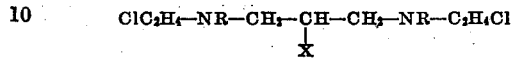

wherein R stands for hydrogen or a $C_2H_4OH-$ or $C_2H_4Cl-$ group and X stands for halogen or a hydroxy group.

The preparation of the new halogenalkylpolyamines is carried out by treating the starting products preferably in presence of inert organic solvents, such as benzene, chlorobenzene, chloroform, trichlorethane, and in absence of water, with thionylchloride at a temperature of 5°–100° C. Generally it is preferable to begin the halogenation at a low temperature and to terminate the reaction by heating in order to quantitatively use the halogenating agent. The halogenated products obtained in this manner are in form of their salts hygroscopic powders, easily soluble in water, yielding more or less stable and generally yellow to brownish solutions.

The completely halogenated polyamines are precipitated from their acid solutions by means of alkali, in form of flocculent white to yellowish precipitates, which are soluble in organic solvents, such as ethanol, benzene, chloroform.

If the halogenated compounds still contain one or several hydroxyalkyl groups, their free bases are better soluble in water and are no more precipitated from their solutions by means of alkalis. These free bases are still soluble in ethanol, but insoluble in chloroform and benzene.

The halogenalkylpolyamines prepared according to the process described above react very easily with ammonia or its organic derivatives and yield new polyamino compounds, which possess valuable properties. This condensation is the second essential step of the present invention.

The preparation of the new polyamino compounds is carried out by heating the above named halogenalkylpolyamines or the halogenalkylhydroxyalkylpolyamines, preferably in presence of a solvent such as water, ethanol or an excess of the organic base used for the condensation and eventually in presence of acid binding agents such as sodium- and potassium carbonate, bicarbonate, hydroxide or acetate, with ammonia and its organic derivatives at temperatures generally not exceeding 200° C., preferably at 60°–120° C.

As organic bases preferably used in the present process there may be cited mono-, di- and trimethyl- and -ethylamine, morpholines, aniline and its derivatives, phenylenediamines, dimethylaniline, benzylamine, hexahydrodimethylaniline, pyridine, quinoline, benzimidazol and the like. In the case where tertiary organic bases are used for the condensation, the reaction products possess one or more quaternary groups and are strong basic compounds.

The condensation products thus obtained are generally more or less colored compounds, which are in form of their salts with organic and inorganic acids easily soluble in water, yielding clear and stable solutions. As free bases they are generally difficultly soluble in water, but in the case they contain one or several quaternary amino groups, they become also soluble in alkaline solutions.

If textile fibres dyed with substantive or acid dyestuffs are treated with aqueous solutions of the products produced by the present process, the fastness properties of the dyeings become greatly improved, especially their fastness to water, cross-dyeing, perspiration and washing. The products of the present process can, therefore, be advantageously used for this purpose. If to the aqueous solutions of such dyestuffs there are added small amounts of solutions of the polyamino compounds produced by the present process, the dyestuffs will be generally quantitatively precipitated, yielding colored lakes useful for various industrial purposes.

One object of the present process is, therefore, the manufacture of new polyamino compounds useful in the dyeing and laking industries, which comprises the two essential steps of halogenation of hydroxyalkylpolyamines and of condensation of the products thus obtained with ammonia and its organic derivatives.

Another object of the present invention are the new polyamino compounds which are valuable products for increasing the fastness of dyeings produced on textiles or substrata with substantive and acid dyestuffs.

The following examples, without being limitative, illustrate the process of the present invention, the parts being by weight:

*Example 1*

30.5 parts of monoethanolamine are heated under stirring to about 100° C. and slowly mixed with 32.5 parts of α,γ-glycerinedichlorhydrine in such a manner that the reaction temperature remains at about 130° C. After such addition the reaction mass is heated to 130° C. for one hour and allowed to cool down to 30° C. The brownish reaction product is then mixed under good stirring with 35 parts of chloroform and thereupon 50 parts of thionylchloride are allowed to slowly flow in drop by drop, whereby the temperature rises to 48° C. and a strong evolution of hydrochloric acid and sulphur dioxide takes place. After the whole quantity of thionylchloride has been added, the thick reaction mass obtained is heated for 2 hours on the water bath at 48° C. and the volatile acids are eliminated by applying vacuum. A dark resinous mass which becomes hard and brittle on cooling is obtained. The halogenation product prepared in this manner is then heated up to 80° C. and treated with 40 parts of pyridine. After heating during 3 hours at about 118° C. a brown colored product is obtained. The same is then dissolved in water and subjected to distillation by steam in order to eliminate some excess of pyridine. After the distillation it is concentrated by evaporation in vacuo to dryness. There is obtained a hard brown colored resin, which is easily soluble in water. From its acid solutions it becomes precipitated by caustic soda in form of clear brown flocks.

By treating cotton or rayon dyed with Chloramine pure blue A with solutions of this product, the fastness of the dyeings to perspiration and to washing will be greatly improved.

*Example 2*

15 parts of monoethanolamine are condensed at 130° C. with 16.5 parts of α,γ-glycerinedichlorhydrine and allowed to cool down to 60° C. At this temperature the condensation product is treated in presence of 20 parts of chlorobenzene with 50 parts of thionylchloride, whereby the temperature rapidly rises to 78° C. and a strong evolution of hydrochloric acid and sulphur dioxide takes place. After heating during 2 hours on the water bath at 70–80° C. the chlorobenzene and the volatile acids are eliminated in vacuo. The condensation product thus obtained is then dissolved in 150 parts of water and 13.5 parts of p-phenylenediamine are added thereto. The solution thus obtained is heated for 4 hours to boiling on the reflux condenser and filtered when still warm. A brown solution useful for improving the fastness properties of dyeings is obtained.

Example 3

30.5 parts of monoethanolamine are condensed at 178–182° C. with 32.5 parts of α, γ-glycerinedichlorhydrine and allowed to cool down to about 60° C. At this temperature and under good stirring 100 parts of thionylchloride are added thereto, whereby the temperature very rapidly rises to 93–95° C. and the reaction mass becomes more and more thick. After 2 hours stirring, it is allowed to cool down to 60° C. and the volatile acids are blown out by means of compressed air. At 60° C. there are then slowly added 47 parts of aniline, whereby the reaction takes place very rapidly and the temperature rises to 148° C. After heating during 1 hour at 120–125° C., the reaction mass is allowed to cool down, dissolved in water, neutralized with sodium bicarbonate and the excess of aniline distilled off with steam. After concentration by evaporation to dryness a brown resinous product, easily soluble in water, is obtained.

Example 4

73 parts of a salt free condensation product from ammonia and α, γ-glycerinedichlorhydrine, which can be obtained by pouring α, γ-glycerinedichlorhydrine drop by drop into a warm alcoholic ammonia solution at 40–45° C., treating the reaction product with sodium hydroxide, filtering and evaporating in vacuo, are mixed with 75 parts of trichlorethylene and treated at 60–78° C. with 180 parts of thionylchloride. The halogenation product is then heated in vacuo to eliminate the volatile acids and the solvent, and introduced into 250 parts of an aqueous ammonia solution (25%) at 40° C. The halogenation product dissolves very rapidly. After elimination of the excess of ammonia and concentration by evaporation to dryness, a yellowish product having strong precipitating properties for substantive dyestuffs is obtained.

Example 5

The halogenation product prepared according to Example 4 is introduced at 40° C. into 240 parts of pyridine and the brownish solution thus obtained is heated during 1 hour at 118° C. After elimination of the excess of pyridine by means of distillation with steam, the solution is concentrated by evaporation to dryness. The product thus obtained is a dark brittle resin, which is easily soluble in water and useful for improving the fastness properties of substantive dyes.

Example 6

To a mixture consisting of 30 parts of water, 20 parts of sodium hydroxide and 30.5 parts of monoethanolamine are slowly added at 110–120° C. 65 parts of α, γ-glycerinedichlorhydrine and after such addition the whole is heated for 2 hours at 110° on the reflux condenser. The water contained in the reaction product is then distilled off in vacuo and the thick paste obtained treated at 60° C. with 150 parts of thionylchloride. The thick reaction product is heated during 2 hours at 100° C. and allowed to cool down. A brittle brownish and hygroscopic resin (about 115 parts) is obtained.

This halogenation product is then introduced into 160 parts of pyridine, slowly heated up to 115–120° C. and maintained at this temperature during 4 hours under good stirring. On cooling down, the condensation product solidifies to a glass-like mass, which is easily soluble in water and yields stable solutions even in presence of alkali. In order to eliminate the small excess of pyridine present in the condensation product, it is dissolved in water and distilled off by means of steam.

By replacing in this example the pyridine by 190 parts of aniline or 110 parts of p- or o-phenylenediamine and by conducting the condensation with the diamines in the presence of ethanol, similar resinous products having a strong precipitating power for substantive dyestuffs will be obtained.

Example 7

47 parts of diethanolamine are condensed at 180–195° C. with 32.5 parts of α, γ-glycerinedichlorhydrine and allowed to cool down to 32° C. At this temperature the condensation product is mixed with 150 parts of thionylchloride, whereby the temperature rapidly rises to 70–73° C. The clear yellowish paste is then stirred during about 3 hours at 70° C. and the excess of thionylchloride and the volatile acids are eliminated by blowing them off with a current of warm air. At 70° C. the halogenation product is mixed with 200 parts of pyridine and heated during 4 hours to 116–118° C. After cooling down a clear brownish condensation product is obtained, which can be used for improving the fastness properties of substantive dyes.

Example 8

In an autoclave of acid-resistant material a mixture consisting of 61 parts of monoethanolamine, 20 parts of sodium hydroxide and 99 parts of dichlorethylene is heated during 10 hours to 140–150° C. After cooling down the greenish condensation product is heated in vacuo to 70–80° C. in order to eliminate the water and the remaining reaction product is mixed under good stirring with 150 parts of thionylchloride. The halogenation is carried out during 8 hours at 30–40° C. and thereupon during 4 hours at 60–70° C. After elimination of the volatile acids, the halogenation product is dissolved in 100 parts of water, neutralized with sodium bicarbonate and after addition of 80 parts of pyridine heated to boiling for 3–4 hours. A clear brownish solution possessing strong precipitating properties for substantitive dyestuffs is obtained.

A similar product is prepared, when pyridine is replaced by an equivalent quantity of quinoline.

Example 9

75 parts of triethanolamine are heated to 100–120° C. and mixed under good stirring with 32.5 parts of α,γ-glycerinedichlorhydrine. After the condensation has taken place, the reaction product is treated in presence of 50 parts of chlorobenzene with 240 parts of thionylchloride and the thick reaction mass stirred during 12 hours at 30–40° C. After elimination of the volatile acids, the halogenation product is dissolved in 300 parts of water and neutralized with sodium carbonate. To the yellow solution thus obtained are added 160 parts of pyridine and the whole is heated for 2 hours to boiling. After distillation of chlorobenzene and excess of pyridine with steam, a clear brown solution, possessing strong precipitating power for substantive dyestuffs is obtained. Dyeings on cotton or rayon with substantive dyestuffs are greatly improved in their fastness to washing and to perspiration after treatment with the condensation product thus obtained.

By replacing in this example the pyridine by 80 parts of benzimidazol, a product possessing similar properties is obtained.

The compounds prepared according to the present process are high molecular noncrystallizable compounds; it is, therefore, difficult to give their exact constitution. But in order to better explain the mechanism of the reaction, the following probable formulae are given for the compounds obtained according to the preceding examples, wherein $x$ means a whole number.

*Example 1*

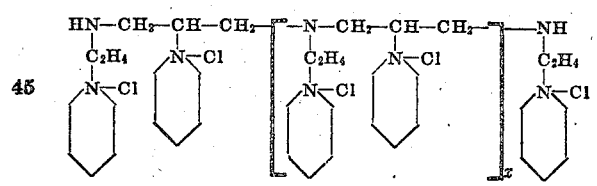

*Example 2*

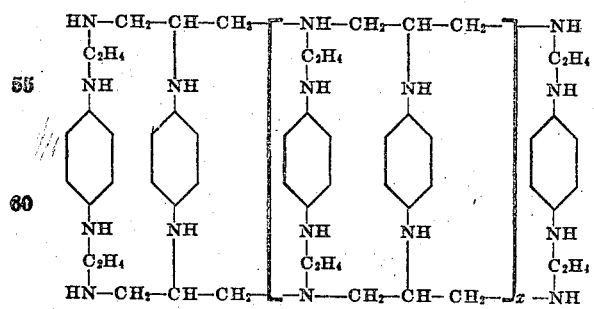

*Example 3*

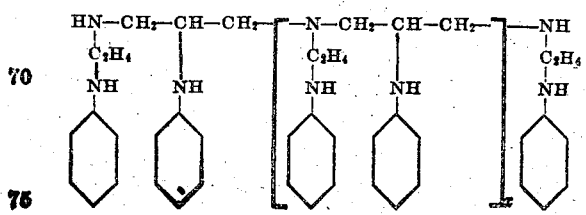

*Example 4*

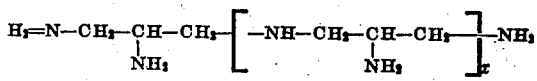

*Example 5*

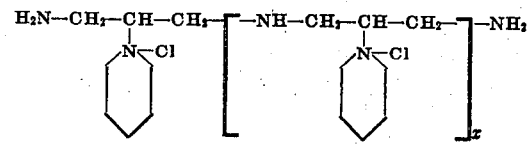

*Example 6*

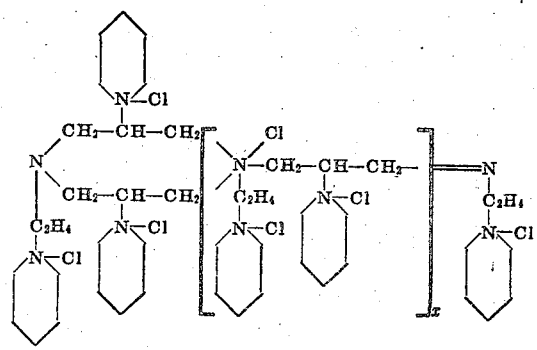

*Example 7*

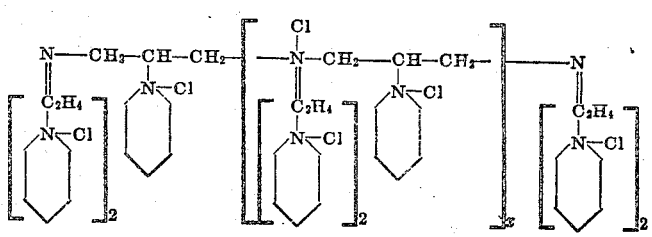

*Example 8*

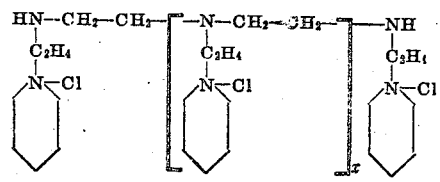

*Example 9*

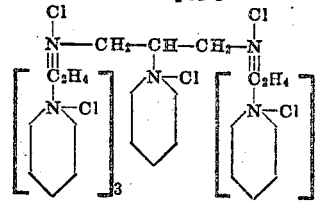

In the above formulae $x$ stands for a whole number.

What I claim is:

1. A process for the manufacture of new basic condensation products, comprising the steps of treating aliphatic hydroxyalkylpolyamines, obtainable by interaction of $\alpha,\gamma$-glycerinedichlorhydrine with an aliphatic hydroxyalkylamine with a halogenating agent selected from the group consisting of thionylchloride, hydrochloric acid and phosphorushalogenides and condensing the halogenalkylpolyamines thus obtained with a nitrogen containing compound selected from the class consisting of ammonia and aliphatic, cycloaliphatic, araliphatic, aromatic, hydroaromatic and heterocyclic primary, secondary and tertiary bases.

2. A process for the manufacture of new basic condensation products, comprising the steps of treating aliphatic hydroxyalkylpolyamines obtainable by interaction of α,γ-glycerinedichlorhydrine with an aliphatic hydroxyalkylamine with thionylchloride and condensing the halogenalkylpolyamines thus obtained with a nitrogen containing compound selected from the class consisting of ammonia and aliphatic, cycloaliphatic, araliphatic, aromatic, hydroaromatic and heterocyclic primary, secondary and tertiary bases.

3. A process for the manufacture of new basic condensation products, comprising the steps of treating aliphatic hydroxyalkylpolyamines obtainable by interaction of α,γ-glycerinedichlorhydrine with an aliphatic hydroxyalkylamine with thionylchloride in presence of an organic solvent selected from the class consisting of chloroform, chlorobenzene and trichlorethane and condensing the halogenalkylpolyamines thus obtained with a nitrogen containing compound selected from the class consisting of ammonia and aliphatic, cycloaliphatic, araliphatic, aromatic, hydroaromatic and heterocyclic primary, secondary and tertiary bases.

4. A process for the manufacture of new basic condensation products, comprising the steps of treating aliphatic hydroxyalkylpolyamines obtainable by interaction of α,γ-glycerinedichlorhydrine with an aliphatic hydroxyalkylamine with thionylchloride in presence of an organic solvent selected from the class consisting of chloroform, chlorobenzene and trichlorethane and at a temperature of 5°-100° C. and condensing the halogenalkylpolyamines thus obtained with a nitrogen containing compound selected from the class consisting of ammonia and aliphatic, cycloaliphatic, araliphatic, aromatic, hydroaromatic and heterocyclic primary, secondary and tertiary bases.

5. A process for the manufacture of new basic condensation products, comprising the steps of treating aliphatic hydroxyalkylpolyamines obtainable by interaction of α,γ-glycerinedichlorhydrine with an aliphatic hydroxyalkylamine, with thionylchloride in presence of an organic solvent selected from the class consisting of chloroform, chlorobenzene and trichlorethane and at a temperature of 5°-100° C. and condensing the halogenalkylpolyamines thus obtained with a heterocyclic base.

6. A process for the manufacture of new basic condensation products, comprising the steps of treating aliphatic hydroxyalkylpolyamines obtainable by interaction of α,γ-glycerinedichlorhydrine with an aliphatic hydroxyalkylamine, with thionylchloride in presence of an organic solvent selected from the class consisting of chloroform, chlorobenzene and trichlorethane and at a temperature of 5°-100° C. and condensing the halogenalkylpolyamines thus obtained with a heterocyclic base at a temperature of 90°-130° C.

7. A process for the manufacture of a new basic condensation product, comprising the steps of treating the aliphatic polyamine obtainable by interaction of α,γ-glycerinedichlorhydrine with monoethanolamine, with thionylchloride in presence of chloroform and at a temperature of 30-50° C. and condensing the halogenalkylpolyamine thus obtained with pyridine at a temperature of 60-120° C.

8. A process for the manufacture of a new basic condensation product, comprising the steps of treating the aliphatic polyamine obtainable by interaction of α,γ-glycerinedichlorhydrine with diethanolamine, with thionylchloride in presence of chloroform and at a temperature of 30-80° C. and condensing the halogenalkylpolyamine thus obtained with pyridine at a temperature of 60-120° C.

9. A process for the manufacture of a new basic condensation product, comprising the steps of treating the aliphatic polyamine obtainable by interaction of α,γ-glycerinedichlorhydrine with triethanolamine, with thionylchloride in presence of chloroform and at a temperature of 30-40° C. and condensing the halogenalkylpolyamine thus obtained with pyridine in presence of water at a temperature of 70-100° C.

10. The new basic condensation products from halogenation of compounds of interaction of α,γ-glycerinedichlorhydrine with an ethanolamine and subsequent condensation with a nitrogen containing compound selected from the class consisting of ammonia and aliphatic, cycloaliphatic, araliphatic, aromatic and heterocyclic primary, secondary and tertiary bases, which are in form of their salts easily soluble in water, giving stable solutions, and which possess the property of precipitating substantive dyestuffs from their aqueous solutions and of giving with such dyestuffs water insoluble or difficultly soluble addition products.

11. The new basic condensation products from halogenation of compounds of interaction of α,γ-glycerinedichlorhydrine with an ethanolamine and subsequent condensation with pyridine, which are in form of their salts easily soluble in water, giving stable solutions, and which possess the property of precipitating substantive dyestuffs from their aqueous solutions and of giving with such dyestuffs water-insoluble or difficultly soluble addition products.

12. The new basic condensation product of the formula:

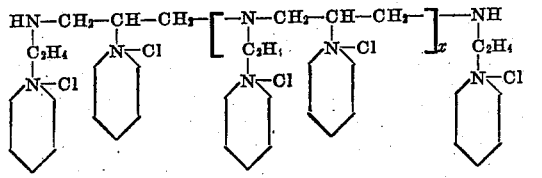

wherein $x$ stands for a whole number as result from the interaction with pyridine of the halogenated condensation product of α,γ-glycerinedichlorhydrine with monoethanolamine, which is a brownish colored hygroscopic and brittle resin-like product easily soluble in water in form of its salts, which possess the property of precipitating substantive dyestuffs from their aqueous solutions and of giving with such dyestuffs water-insoluble or difficultly soluble addition products.

13. The new basic condensation product of the formula:

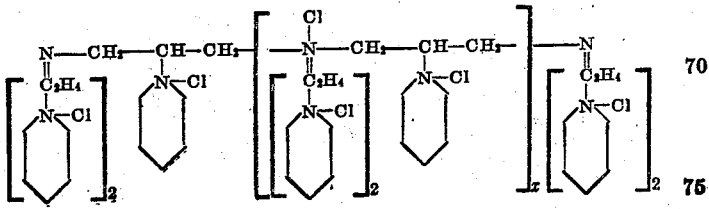

wherein $x$ stands for a whole number as result from the interaction with pyridine of the halogenated condensation product of $\alpha,\gamma$-glycerinedichlorhydrine with diethanolamine, which is a brownish colored hygroscopic and brittle resin-like product easily soluble in water in form of its salts, which possess the property of precipitating substantive dyestuffs from their aqueous solutions and of giving with such dyestuffs water-insoluble or difficultly soluble addition products.

14. The new basic condensation product of the formula:

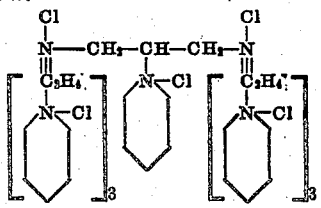

as result from the interaction with pyridine of the halogenated condensation product of $\alpha,\gamma$-glycerinedichlorhydrine with triethanolamine, which is a brownish colored hygroscopic and brittle, resin-like product, easily soluble in water in form of its salts or as free base, which possesses the property of precipitating substantive dyestuffs from their aqueous solutions and of giving with such dyestuffs water-insoluble or difficultly soluble addition products.

VALENTIN KARTASCHOFF.